United States Patent [19]

Miles et al.

[11] Patent Number: 4,869,235

[45] Date of Patent: Sep. 26, 1989

[54] FIELD BURNER

[76] Inventors: Thomas R. Miles, 5475 S.W. Arrowwood La., Portland, Oreg. 97225; Bill L. Rose, 7566 S. Schneider Rd., Canby, Oreg. 97013

[21] Appl. No.: 328,190

[22] Filed: Mar. 24, 1989

[51] Int. Cl.[4] .............................................. F23C 5/00
[52] U.S. Cl. ............................................ 126/271.2 R
[58] Field of Search ................. 126/271.1, 271.2 R, 126/271.2 A, 271.2 C; 404/77, 79, 95

[56] References Cited

U.S. PATENT DOCUMENTS

| | | | |
|---|---|---|---|
| 3,160,154 | 12/1964 | Sowell | 126/271.12 A |
| 3,382,864 | 5/1968 | Fannin et al. | 126/271.2 A |
| 3,809,060 | 5/1974 | Shirley et al. | 126/271.2 C |
| 4,088,122 | 5/1978 | Miles | 126/271.2 R |

Primary Examiner—Carroll B. Dority
Attorney, Agent, or Firm—Klarquist, Sparkman, Campbell, Leight & Whinston

[57] ABSTRACT

A wheel supported vehicle having a burning chamber, a draft stack in communication with a forward end of the burning chamber and a burner at a rear of the burning chamber. An air mover means operable to deliver air to the stack and to the burning chamber. As the vehicle is moved forwardly over a field, the heat from burning combustible material at the rearward end of the chamber will be drawn forwardly to evaporate moisture from the combustible material in the path of the chamber so that it will move readily ignite and burn clearly.

5 Claims, 2 Drawing Sheets

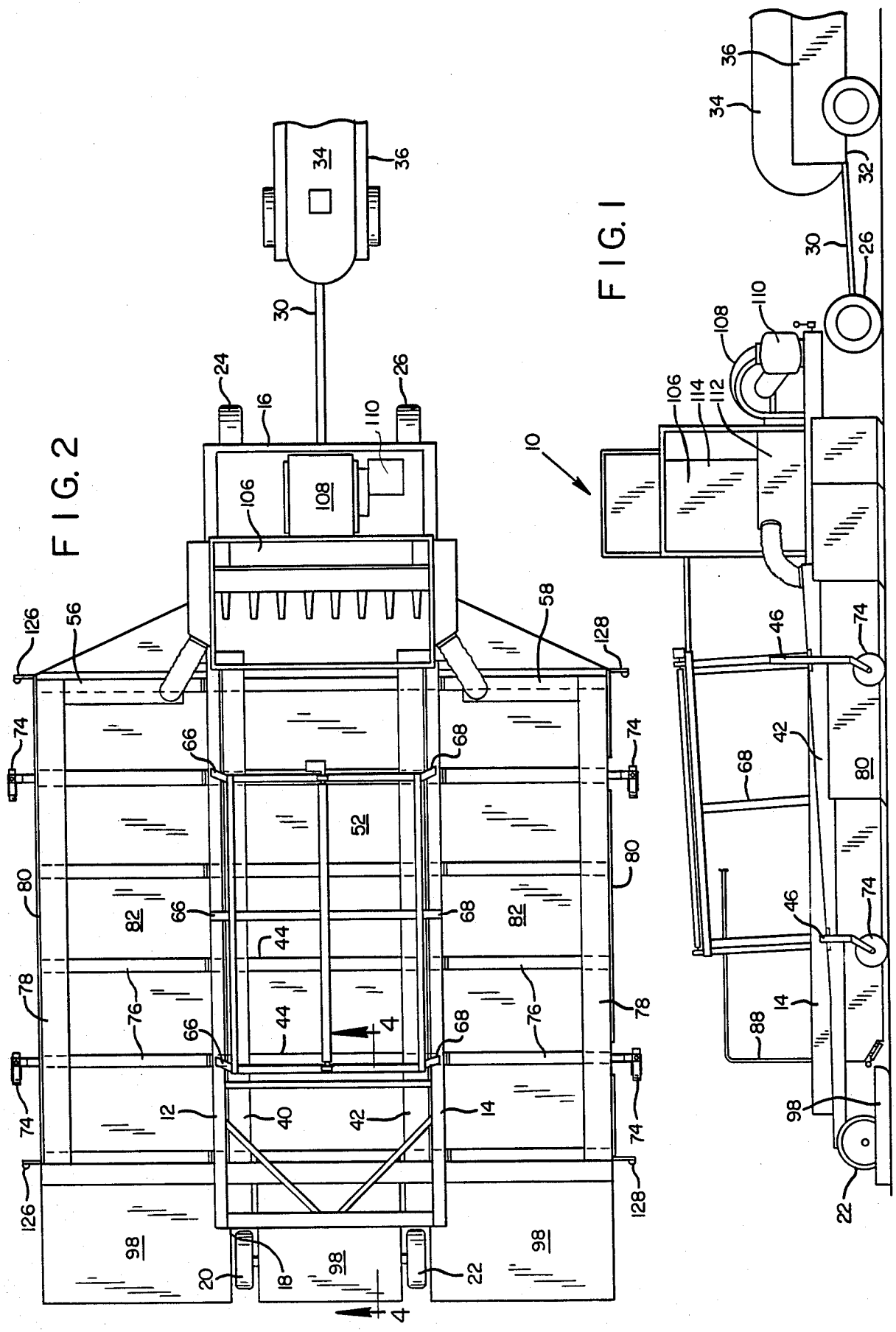

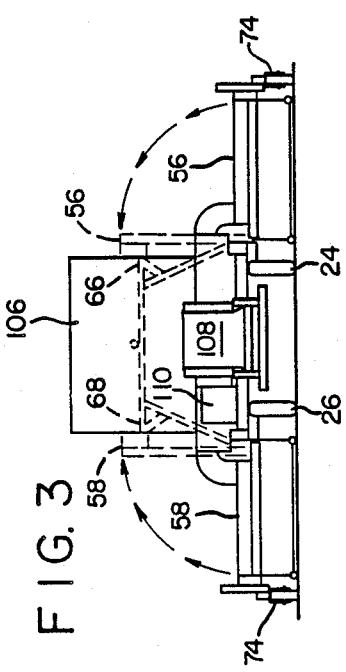
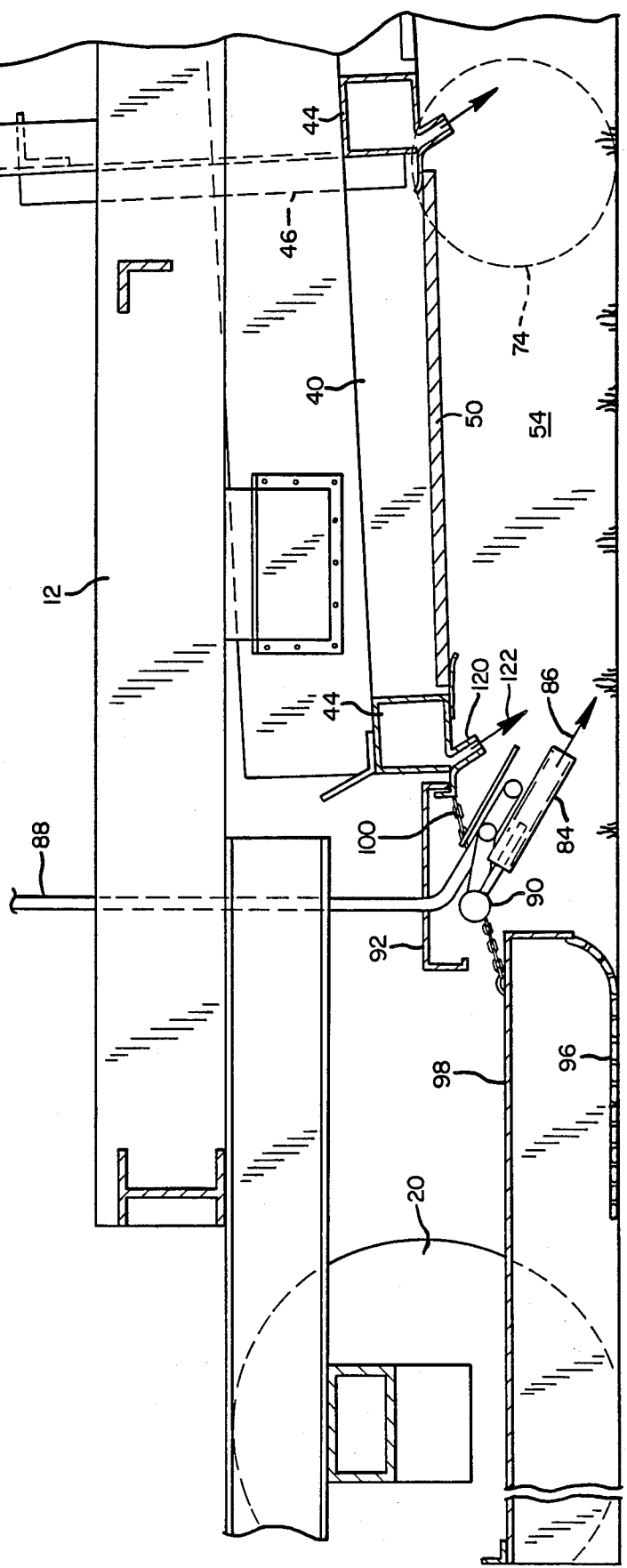

FIELD BURNER

The present invention relates to an improved field burning method and apparatus and more particularly to an apparatus and method for thermally cultivating a field by burning combustible residue on the surface of the field with a minimum of visible smoke.

BACKGROUND

As noted in U.S. Pat. No. 4,088,122 for FIELD BURNING APPARATUS, of which Thomas R. Miles, co-inventor herein, was the inventor, in certain types of agriculture it is often desirable thermally to cultivate a field which has been cropped. For example, in the production of grass seed, it is desired to dispose of the excess grass stems after harvesting of the seeds and to sterilize the fields to dispose of weed seeds, insect pests and undesirable fungi spores. The apparatus of such patent was particularly designed for use in burning residue material remaining in seed grass fields in the Willamette Valley of Oregon after harvest of the seeds to accomplish such ends. The apparatus of such patent, however, proved to have limited economic effectiveness. It comprised a wheel supported, elongated hood to be drawn or propelled along a field. A draft inducing means was provided at the forward end of the apparatus to induce air flow from the sides and rear of the hood towards the forward end. An air blower was also arranged to discharge air into the rearward portion of the hood to provide additional air to assist in complete combustion of all the residue. Field residue was ignited at the forward end of the hood as the apparatus moved down a field. While the apparatus was effective in burning residue from fields that were quite dry, it was not effective when fields were damp from dew or rain and the operative period within a growing season is uneconomically short. As a result, open field burning has continued to be the preferred method of removing grass field residues in the Willamette Valley. However, the valley lies between the Coast Range to the west and the Cascade Range to the east and which, in the late summer and fall of the year, shelter the valley from persistent winds and inversion periods frequently occur, trapping smoke and other gaseous products. Consequently, severe restrictions have been placed upon the periods of burning and the acreage that can be open burned in an effort to restrict the amount of smoke that is generated. If weather conditions severely restrict the amount of permitted open burning, it places a severe economic burden on the grass seed farmer who will be forced to use expensive mechanical methods to remove the debris and expensive and sometimes inefficient methods of killing insect pests, weeds and fungi. More recently, because of the increasing concern over the health hazard of the smoke resulting from open field burning, there exists a strong effort to prohibit totally open field burning.

SUMMARY OF THE INVENTION

Accordingly, it is an object of the present invention to provide an improved method and apparatus for burning residue from a field.

More particularly, it is an object of the present invention to provide a method and apparatus for burning residue from a field even when such residue is not dry.

Another object is to provide a method and apparatus that will burn field residue with substantially no visible combustion products.

Still another object of the invention is to provide an improved field burning apparatus that, because of its longer useful operative period in a season, its use is a viable option to open field burning in the growing of grass seed.

These and other objects and advantages of the invention are attained in the apparatus of the invention, which as indicated previously, is an improvement upon the apparatus of U.S. Pat. No. 4,088,122. Like the patented apparatus, the apparatus of the invention comprises a wheel supported elongated hood with draft inducing apparatus at the forward end thereof. Positioned adjacent the rearward end of the hood are a plurality of forwardly and downwardly projecting burning nozzles through which a fluid fuel may be burned. In use, this apparatus differs from that of U.S. Pat. No. 4,088,122 in that instead of igniting the field residue adjacent the forward end of the hood of such apparatus, the residue is ignited adjacent the rearward end. Thus, as the apparatus is drawn over a field the hot gases from the burning material adjacent the rearward portion of the hood are drawn forwardly by the draft inducing means at the forward end so as to cause moisture to evaporate from the unburned residue whereby such residue is ignited more readily by the forwardly advancing flame and burns completely and cleanly. The burners provide supplemental heat when the moisture content of the residue is so high that the heat from the burning residue is not itself sufficient to reduce the moisture content of the residue sufficiently to obtain efficient burning. Also, a drag such as a chain has been provided to follow the hood and extinguish the flames from any burning grass clumps or other residue, the drag being enclosed by a cover to catch any smoke from such clumps so that it will draw into the hood. The improved method and apparatus have proved to be capable of burning field residue of substantial moisture content with substantially no smoke or other visible emissions, enabling operation of the apparatus substantially continuously night and day and also on fields having insufficient residue to support burning with the apparatus of U.S. Pat. No. 4,088,122.

BRIEF DESCRIPTION OF THE DRAWINGS

FIG. 1 is a side elevation of the apparatus of the invention showing the same connected to a trailer containing a supply of fuel and water for the operation thereof;

FIG. 2 is a top plan view of the apparatus as arranged for movement over a field;

FIG. 3 is a front elevation on a reduced scale of the apparatus;

FIG. 4 is a fragmentary cross-sectional view taken along line 4—4 of FIG. 2;

DETAILED DESCRIPTION OF THE INVENTION

Referring now to FIGS. 1 and 2 of the drawings, the field burning apparatus of the present invention, generally designated at 10, is a wheel supported vehicle having longitudinal, laterally opposed frame members 12 and 14 interconnected by transversely extending end frame members 16, 18.

The elongate frame members 12, 14 and the transversely extending frame members 16, 18 are supported upon rear wheels 20, 22 and front wheels 24, 26. Wheel sets 20, 22 and 24,26 are suitably mounted and preferably are steerable such as by the system illustrated and described in detail in U.S. Pat. No. 4,088,122. Reference is made to such patent for details of such system.

A tongue 30 is adapted for connection at one end to a hitch on the end of a trailer 32 upon which are mounted a tank 34 for a supply of propane and a tank 36 for supply of water and which trailer, in turn, is adapted to be pulled by a tractor (not shown).

Suspended between the frame members 12, 14 is a subframe comprising tubular side ducts 40, 42 between which extend a plurality of hollow cross members or air bars 44 which are in communication with the interior of the side ducts 40, 42. The side ducts 40, 42 are suspended from the frame members 12, 14 by a plurality of suspension posts 46 with the ducts sloping downwardly toward the rear of the apparatus as may be seen in Figs. 1 and 4. Attached to and supported by the air bars 44 ar metal sheets 50 which define a cover, generally designated at 52 for what constitutes the central portion of a burning chamber 54.

To extend the useful width of the apparatus, wings 56, 58 are hingedly attached to the opposite sides of the apparatus for movement between a horizontal position, as shown in solid lines in FIG. 3, and an upright transport position as shown in dotted lines wherein the wings rest upon supports 66, and 68, respectively. For a more complete description of a suitable arrangement for hingedly attaching such wings and raising and lowering them, reference is made to U.S. Pat. No. 4,088,122. The wings 56, 58 are supported at their outer ends on wheels 74 in their lowered, field burning position and each has a plurality of transversely extending hollow tubes or air bars 76 which are attached to and communicate with an outside, longitudinal tubular frame member 78. Each of the wings 56, 58 supports a plurality of side panels or skirts 80 and each is covered by top panels 82 to further define the burning chamber 54.

Referring now to FIG. 4, in accordance with the present invention, at the rearward end of the burner chamber 54 are mounted burner means comprising a plurality of nozzles 84 adapted to burn a liquid or gaseous fuel, such as propane. The nozzles are suitably supported rearwardly of the rearmost air bars 44, 76 and are inclined downwardly and forwardly so as to project an igniting flame forwardly and downwardly upon the field residue therebeneath, as indicated by the arrow 86. The nozzles are spaced so as to get a relatively even distribution of flame upon the surface of the field as the apparatus moves up the field. Propane is fed to the nozzles 84 from the tank 34 through a line 88 having appropriate valves therein which preferably are actuatable from the pulling tractor through a suitable control system. Each bank of nozzles ha associated therewith conventional evaporator 90 to effect vaporization of the propane fed thereto. A shield 92 is preferably supported from the rear air bars 44, 76 to deflect heat downwardly from the burners.

To extinguish flames from stubble and any other material that is not completely consumed by the passage of the apparatus thereover, drag means are provided to engage such material following the burners 84. The illustrated drag comprises chains 96 which are preferably positioned beneath a hood means in the form of skids 98 closed at the rear and sides, but open at the front end thereof, which are connected by chains 100 to the rearmost air bars so they will be pulled along the ground as the apparatus moves down a field.

The skirts so aid in preventing spread of fire and define the side portions of the burning chamber 54.

As shown in FIG. 1, a draft stack 106 and a supporting framework are arranged at a forward end of the burner 10. A suitable supporting framework is fully described in U.S. Pat. No. 4,088,122. The stack 106 communicates directly with the interior of the burning chamber 54.

An air mover means such as fan 108 is illustrated in FIG. 1 and is supported upon the framework for operation by a drive motor 110 for drawing in ambient air and discharging it upwardly through the stack 106. A plenum 112 is connected to the outlet of the fan 81 for directing air upwardly through a draft inducing throat 114 in the stack 106. A damper system, such as described in U.S. Pat. No. 4,088,122, may be provided to control the draft through the stack.

The plenum 112 is connected so as to direct air into the side ducts 40, 42 and also to the outer frame members 78 of the wings 56, 58. This air will, of course, in turn flow through the air bars 44, 76 each of which are provided with outlets, such as shown at 120 in FIG. 4, for directing air downwardly and forwardly as indicated by the arrows 122. A damper valve (not shown) may be provided to vary the amount of air discharged through the air bar outlets 120.

To minimize the possibility of fire spreading to the unburned material to one side of the apparatus, a steam generator (not shown) may be provided on the apparatus for generating steam from water drawn from the reservoir 36 and which steam will be sprayed from a nozzle 126 or 128 positioned at the forward outer corners of the wings 56, 58, respectively. Steam need be sprayed only upon the material to the unburned side of the machine. Appropriate controls (not shown) operable from the tractor may be provided.

OPERATION OF THE FIELD BURNING APPARATUS

When it is desired to burn combustible material on the ground for thermally cultivating a field, the apparatus 10 is transported to a selected field and the wing sections 56, 58 lowered to their horizontal position wherein the side skirts so panels will be positioned close to the ground adjacent their bottom edges. As the apparatus commences movement across the field the nozzles 84 are ignited which in turn will ignite the combustible material adjacent the rearward end of the apparatus. Steam or water spray is commenced from the appropriate nozzles 126 or 128. The fan 108 is actuated to move air and induce a draft through draft stack 106. A negative pressure is thereby created within the interior of the burning chamber 54. This causes air currents to continuously be drawn forwardly through the burning chamber 54 and upwardly through the draft stack 106. As the apparatus is moved forwardly by a connected mover, such as a tractor or the like, the induced air travelling upwardly through the stack 106 continually draws air and gaseous combustion product forwardly from the burning material at the rearward end of the burning chamber over the unburned material positioned adjacent the forward end. The heat from the rearwardly positioned burning material will dehydrate any moist or green residual material beneath the forward end of the hood so that it will ignite more readily and burn cleanly as the machine moves thereover. If the combustible material is sufficiently dry, once ignition has been thoroughly made, the nozzles 84 may be shut off and the combustion supported solely by the combustible material on the field. However, if the moisture content of the material is too great for the residual material completely to burn by itself, the nozzles 84 can continue in operation and the amount of flame adjusted so as to effect complete combustion of the materials on the ground but without overheating the ground surface. It has been found that with the positioning of the nozzles 84 at the rearward end of the apparatus, their use as a supplemental heat source permits the apparatus to be operated under a wider range of conditions, including periods when the grass is wet from dew or after a light rain or when green from regrowth, conditions under which the apparatus of U.S. Pat. No. 4,088,122 could not be utilized. Moreover, because the burning gases have a substantially long burning chamber in which the heat is confined and auxiliary air blown in through the air outlets 120, the gases generated by the burning of the residue are substantially completely burned and the apparatus emits substantially no visible smoke. It can, therefore, be operated night and day.

It usually will be desirable to remove excess straw from the field prior to utilizing the burner apparatus of the invention so that the total combustible material is about no more than about three tons per acre.

Having illustrated and described the preferred embodiment of the invention, it will be apparent to those skilled in the art that the invention permits a modification in arrangement and detail. We claim all such arrangements which come within the purview of the scope of the appended claims.

We claim:

1. Apparatus for burning combustible material on the ground to thermally cultivate a field comprising:
    wheel supported vehicle means having a forward end and a frame and a frame-connected cover means, said cover means being elevated from the ground surface and including side portions for defining a burning chamber;
    draft stack means disposed adjacent to the forward end of said vehicle means, said stack means communicating directly with said burning chamber and extending upwardly from said cover means;
    air mover means disposed adjacent to said stack mean operable for delivering ambient air to said stack means; and
    means for increasing the velocity of air delivered from said air mover means and for inducing a draft forwardly through said burning chamber and into said stack;
    burner means at the rearward end of said burning chamber for directing an igniting flame onto combustible material therebeneath to ignite the same;
    whereby as said apparatus is moved forwardly over a field the heat from the burning combustible material at the rearward end of said chamber will be drawn forwardly to evaporate moisture from the combustible material in the path of said chamber so that it will more readily ignite and burn cleanly.

2. The apparatus of claim 1 including drag means connected to said frame for engaging the ground surface rearwardly of said burner means as said apparatus is moved across a field to engage burning material and extinguish any flame therefrom.

3. The apparatus of claim 1 including a hood means extending over said drag means and defining an enclosure open at the forward end thereof and communicating with said burning chamber whereby smoke and gaseous ignition products arising from burning material encountered by said drag means will be drawn into said chamber and thence to said stack.

4. The method of burning combustible material such as straw or grass from the surface of a field comprising:
    providing a vehicle having an elongate longitudinally extending hood supported thereon, said hood including a top and sides defining a combustion chamber;
    providing a draft inducing means at the forward end of said hood;
    moving said vehicle forwardly over a field and operating said draft inducing means to effect a forward current of gases beneath said hood; and
    igniting the combustible material beneath said hood with burner means adjacent the rearward end thereof whereby as said vehicle moves forwardly over a field the heated combustion gases from the burning combustible material adjacent the rearward end of the hood will be drawn forwardly of said burning material to evaporate moisture from the unignited material forward of the burning material whereby said unignited material will ignite more easily from the forwardly progressing flame from the more rearwardly burning material and will burn more completely and cleanly.

5. The method of claim 4 wherein said burner means includes a plurality of forwardly and downwardly projecting burner nozzles in the rearward end of said hood and a gaseous or fluid fuel is projected through said nozzles to generate supplementary heat beneath said hood to aid in the combustion of said combustible material as said apparatus is moved across a field.

* * * * *